(12) United States Patent
Hammer

(10) Patent No.: US 8,366,006 B2
(45) Date of Patent: Feb. 5, 2013

(54) COMBINED LASER AND IMAGING SCANNER

(75) Inventor: Steven J. Hammer, Lilburn, GA (US)

(73) Assignee: NCR Corporation, Duluth, GA (US)

( * ) Notice: Subject to any disclaimer, the term of this patent is extended or adjusted under 35 U.S.C. 154(b) by 36 days.

(21) Appl. No.: 12/976,611

(22) Filed: Dec. 22, 2010

(65) Prior Publication Data
US 2012/0160910 A1 Jun. 28, 2012

(51) Int. Cl.
*G02B 5/00* (2006.01)
*G06K 7/10* (2006.01)

(52) U.S. Cl. ............ 235/462.32; 235/454; 235/462.12

(58) Field of Classification Search .......... 235/462.14, 235/462.32–462.43, 379, 383, 454
See application file for complete search history.

(56) References Cited

U.S. PATENT DOCUMENTS

| | | | | |
|---|---|---|---|---|
| 4,086,476 | A * | 4/1978 | King | 235/462.31 |
| 6,189,795 | B1 * | 2/2001 | Ohkawa et al. | 235/462.39 |
| 6,681,993 | B1 * | 1/2004 | Nunnink et al. | 235/462.38 |
| 7,748,631 | B2 * | 7/2010 | Patel et al. | 235/462.14 |
| 7,780,086 | B2 * | 8/2010 | Barkan et al. | 235/462.32 |
| 2006/0022051 | A1 * | 2/2006 | Patel et al. | 235/462.14 |

* cited by examiner

*Primary Examiner* — Jamara Franklin
(74) *Attorney, Agent, or Firm* — Paul W. Martin

(57) ABSTRACT

A combined laser and imaging scanner has an image capture device located under a horizontal platen such that the field of view of the image capture device points away from an operator side of the scanner in order to capture an image of an optical code which is being scanned by the laser scanner through the horizontal platen. The image capture device is located in amongst the mirrors which form the scanning optics of the laser scanner.

18 Claims, 3 Drawing Sheets

COMBINED LASER AND IMAGING SCANNER

FIELD OF THE INVENTION

This invention relates to a combined laser and imaging scanner. In particular, but not exclusively, it relates to a hybrid bi-optic laser scanner with an imaging scanner located under a horizontal platen thereof.

BACKGROUND TO THE INVENTION

The original bi-optic laser scanners were typically designed to have a single laser light source along with its detector, collector and electronics located under the horizontal platen with only the mirrors required to scan in the vertical behind the vertical platen. However, in an effort to maximize scanner performance, the bi-optic barcode scanners of retail checkout terminals have evolved over the years into rather complex devices with multiple laser light sources, collectors, detector assemblies, mirrors and electronics. These components are typically located behind both horizontal and vertical platens from which the optical codes are read.

In an attempt to produce a combined laser and imaging scanner a camera has been placed behind the vertical platen. However, in order to provide the necessary contrast to read an optical code it is necessary to provide flashing LED light sources behind the platen. Placing these LEDs behind the vertical platen, results in the operator of the checkout terminal being located directly in the line of site. Consequently, this arrangement can result in operator eye fatigue, headaches, and even the onset of a seizure if the operator is susceptible to them.

Another issue with current combined laser and imaging scanner located in the vertical window, is that there are no means by which the operator can easily determine if the barcode is aligned to the field of view of the imaging scanner. The geometry of current imaging scanners is such that the barcodes are scanned and imaged on either the underside of an object or on the side of the object remote from the operator. This makes it very difficult for the operator to align the barcode with the camera which can lead to incomplete or blurred images of the barcode and incomplete or inaccurate decoding of the image of the barcode.

Today's high performance bi-optic scanners have six sided, omni-directional, high speed scanning capabilities. That is, no matter which side or what angle the barcode is oriented on an item, the scanner has the capability to decode it at scan speeds equal to or greater than cashier's scanning capabilities. For the scanner to have this capability, the horizontal window must be large enough to accommodate the plethora of laser lines and angles. These large, horizontal windows must resist scratching and breaking in the harsh retail environment, and are therefore made out of expensive materials such as Sapphire or Diamond Like Carbon (DLC) coated glass. The horizontal window is therefore the most expensive component in the scanner. The vertical window imager does not allow the scanner designer the opportunity to significantly reduce the cost of the scanner since the cost of the components in the vertical window are small compared to cost of the components in the horizontal window.

The combining of an imaging scanner along with a laser barcode scanner reduces the opportunity for fraudulent transactions where an operator scans a low priced or non-restricted item such as a package of gum, and passes a high priced item or a restricted item such as a cell phone as alcohol to the customer, so called "sweethearting". The imaging scanner can be used to correlate the laser scanned barcode with an image of the item to reduce the opportunity for such "sweethearting".

Also, the imaging scanner can be used for produce recognition, for example to distinguish between a pear and an apple when they are placed adjacent the window so that the price of loose items can be accurately calculated with minimum operator intervention.

SUMMARY OF THE INVENTION

According to a first aspect of the present invention there is provided a combined laser and imaging scanner comprising;
a laser light source;
scanning optics;
a detector;
a processor;
an image capture device; and
a first window aligned in a horizontal;
the laser light source and the scanning optics being arranged to output a laser scan pattern through the first window;
the scanning optics being further arranged to direct light scattered from an optical code on an object being scanned to the detector via the first window;
the image capture device being located underneath the first window such that the first window encompasses a field of view of the image capture device; and
the image capture device being arranged to capture an image of an optical code on an object placed before the first window.

A viewing axis of the image capture device may be directed away from an operator side of the scanner.

The scanner may comprise a second window aligned in a vertical plane adjacent the first window, the scanning optics being further arranged to output a laser scan pattern through the second window and to direct light scattered from an optical code on an object being scanned to the detector via the second window.

The second window may located adjacent a side of the first window remote from an operator side of the scanner.

The scanner may comprise a light source associated with the image capture device. The light source may be aligned with the viewing axis of the image capture device. The light source may be cycled on and off. The light source may comprise a plurality of light emitting diodes (LEDs).

The image capture device may be inclined at an angle between the horizontal and vertical. The image capture device may be inclined at approximately 45° to the horizontal window.

This allows cashier side reading of barcodes on items as well as reducing retro-reflections of the LED light off of the window back into the image capture device which may "blind" the imager.

Also, the alignment of the light source with the axis of the image capture device, i.e. pointing away from the operator, prevents the light source from shining into the eyes of the operator, thereby preventing operator headaches, fatigue and possible seizures.

The first window may comprise a target marker indicative of the centre of the field of view of the image capture device. The target marker may comprise an indicia on the window arranged such that it disperses laser light passing through the first window.

The scanner may comprise a marker laser arranged project light through the first window parallel to a viewing axis of the image capture device.

Such markers allow the operator to easily align the barcode to be imaged with the axis of the image capture device. This improves the quality of the captured image and thereby reduces the likelihood the incomplete or inaccurate decoding of the image of the barcode.

The first window may have a width to length ratio of approximately 1:6. The first window may have its longitudinal axis running perpendicular to the direction of travel of objects to be scanned over the first window. The first window may have a width of 53 mm or less, preferably 26 mm or less. The first window may have a length of 155 mm or less. The first window may comprise sapphire.

Such a narrow window significantly reduces the cost of manufacture of the terminal and also increases the strength of the window in the direction of passage of goods over the window.

The image capture device may comprise a charge coupled device (CCD) array. The image capture device may comprise a complimentary metal-oxide semiconductor (CMOS) imaging array.

The processor may be arranged to process data corresponding to an image captured at the image capture device. The processor may be arranged to process data corresponding to a signal generated in response to the light scattered from the optical code on the object being scanned to the detector via the first window According to a second aspect of the present invention there is provided a terminal comprising a scanner according to the first aspect of the present invention.

The terminal may comprise any of the following: an automated teller machine (ATM), an information kiosk, an electronic funds transfer (EFT) terminal, a financial services centre, a bill payment kiosk, a lottery kiosk, a postal services machine, a check-in and/or check-out terminal, a self-checkout point-of-sale (POS) terminal, POS terminal.

According to a third aspect of the present invention there is provided a method of operating a combined laser and imaging scanner comprising the steps of:
generating a laser scan pattern from a laser light source using scanning optics;
outputting the laser scan pattern through a first window of the scanner, the first window being aligned in a horizontal plane;
directing light scattered from an optical code on an object being scanned to a detector via the first window and the scanning optics;
encompassing a field of view of an image capture device located underneath the first window by the first window; and capturing an image of an optical code on an object placed before the first window at the image capture device.

The method may comprise directing a viewing axis of the image capture device away from an operator side of the scanner.

The method may comprise outputting a laser scan pattern through the second window via the scanning optics and directing light scattered from an optical code on an object being scanned to the detector via the second window.

The method may comprise locating the second window adjacent a side of the first window remote from an operator side of the scanner.

The method may comprise illuminating a region adjacent the first window by a light source aligned with the viewing axis of the image capture device. The method may comprise cycling the light source on and off.

The method may comprise projecting an aiming light through the first window parallel to a viewing axis of the image capture device.

The method may comprise processing data corresponding to an image captured at the image capture device at a processor of the scanner. The method may comprise processing data corresponding to a signal generated in response to the light scattered from the optical code on the object being scanned to the detector via the first window, at a processor of the scanner.

DETAILED DESCRIPTION OF THE PREFERRED EMBODIMENTS

Figure 1:
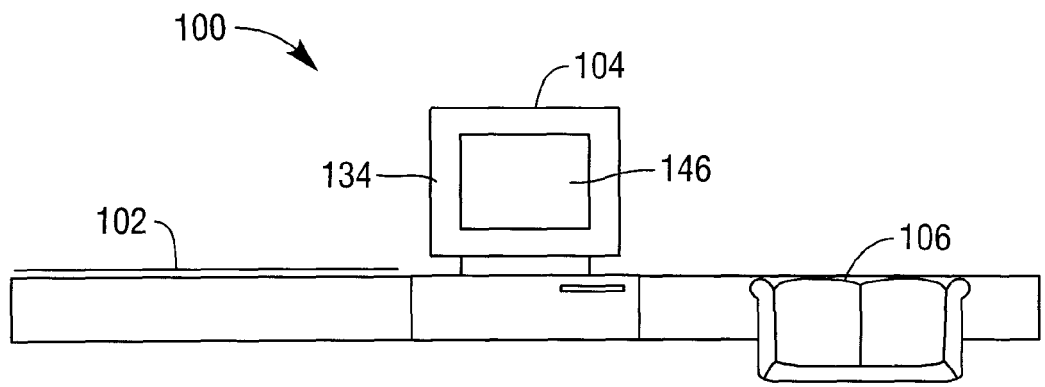
FIG. 1 is a schematic representation of a checkout terminal comprising a bi-optic combined laser and imaging scanner according to an aspect of the present invention.
Figure 2:
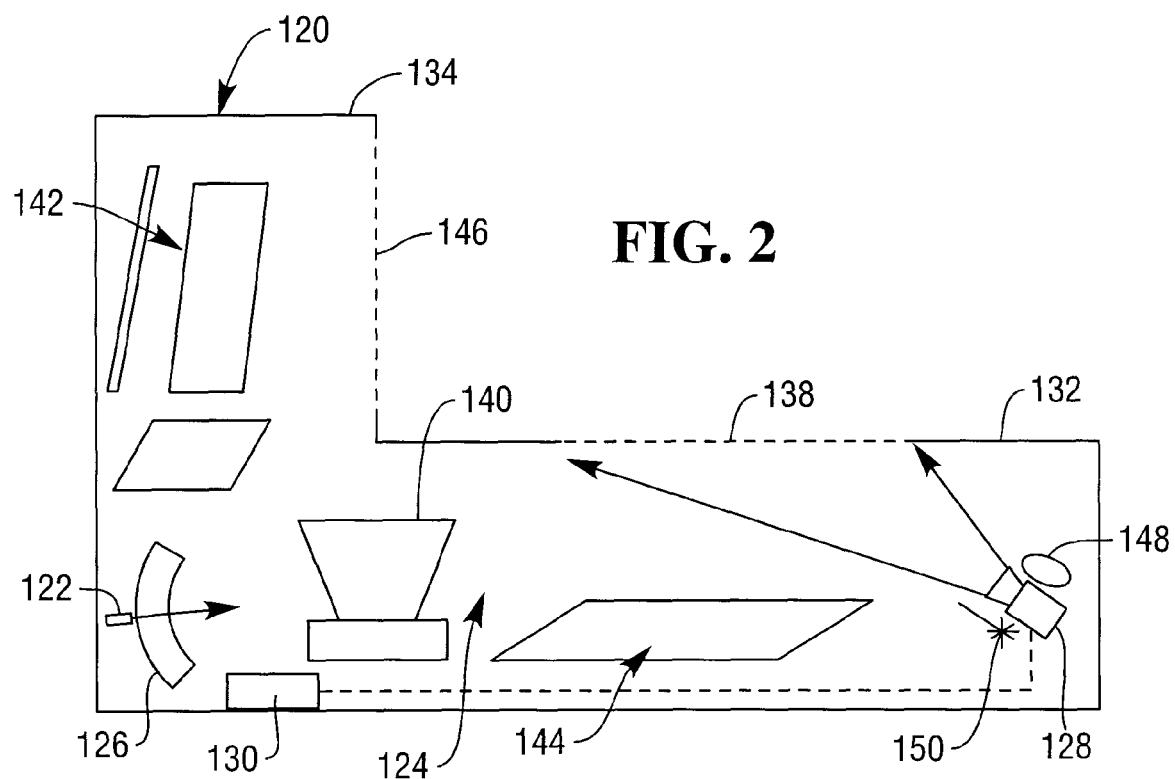
FIG. 2 is a schematic representation of a bi-optic combined laser and imaging scanner according to an aspect of the present invention.
Figure 3:
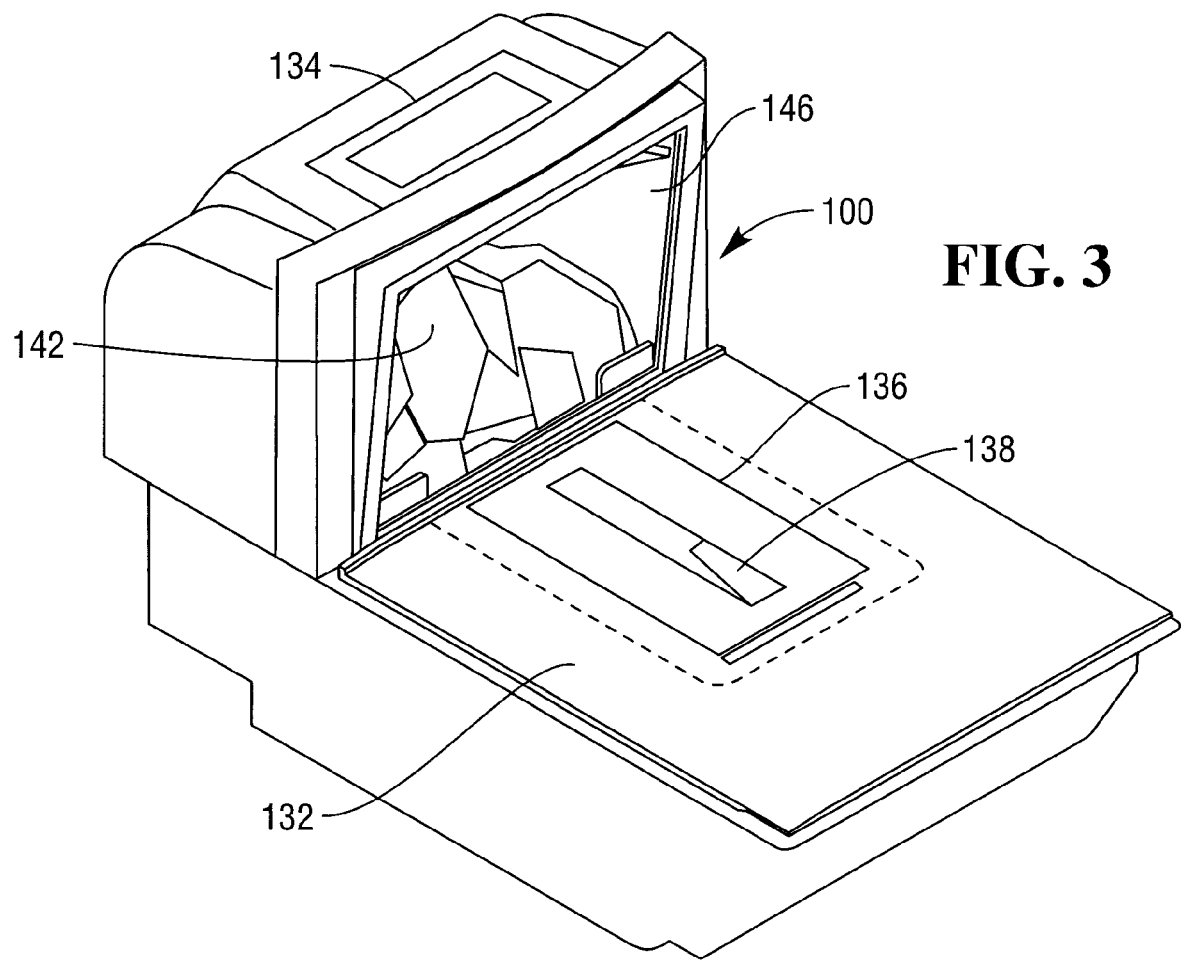
FIG. 3 is a perspective view of the exterior of the scanner of FIG. 2.

Referring now to FIGS. 1 to 3, a retail checkout terminal 100 comprises a conveyor belt drive 102, a combined barcode and image scanner 104 and a bagging area 106.

A customer places their purchased items on the belt drive 102 such that they are driven to the scanner 104 where the sales assistant scans the items and places them in the bagging area 106 for the customer to bag up.

The scanner 104 comprises a housing 120, a laser light source 122, scanning optics 124, a detector 126, an image capture device 128 and a processor 130.

The housing 120 comprises a horizontal platen 132 and a vertical optics tower 134. The horizontal platen 132 comprises a weighing scale portion 136 having an elongate window 138 through it which runs perpendicular to the direction of drive of the belt drive 102. The image capture device 128, typically a CMOS imaging array or CCD camera, lies underneath the window 138 and typically has a line of sight directed to vertical optics tower 134 and away from the operator of the terminal 100.

The scanning optics 124 comprise a mirrored spinner 140, vertical pattern mirrors 142 located in the vertical optics tower 134 and horizontal pattern mirrors 144 located under the horizontal platen 132 which generate a scan pattern from laser light emitted by the laser light source 122 and direct backscattered light onto the detector 126. The scan pattern is output via the elongate window 138 and a large window 146 of the vertical optics tower 134, with backscattered light being collected via these windows 138, 146. The detailed construction and operation of a bi-optic barcode scanner is described in U.S. Pat. No. 5,229,588 the contents of which are incorporated herein by reference.

In some embodiments, the image capture device 128 has a light source 148 associated with it which illuminates the region external of the housing 120 adjacent the window 138. This provides for adequate contrast of an optical code to be imaged. Typically, the light source 148 comprises one or more LEDs which may be cycled/flashing/synchronized to the camera frame rate (to reduce heat and power usage).

In some embodiments, the image capture device 128 can have a laser aimer 150 associated with it which projects a laser beam out through the window 138. The laser aimer 150 is aligned with the viewing axis of the image capture device 128 such that when an object is placed in front of window 138 the laser beam or a pattern associated with it is observable on the object by the terminal's operator. This enables the operator to easily align an optical code on the object with the viewing axis of the image capture device 128 and thereby improves the efficiency and accuracy of the imaging of the optical code. Alternatively, or additionally, the window 138 may comprise a marking, for example cross-hairs, etched into it such that the a portion of the light associated with scan pattern generated by the laser light source 122 and the scanning optics 124 scatter from the etched marking. The etched marking corresponds with the intersection of the viewing axis of the image capture device 128 with the window 138. The scattered light will be visible to the operator and can be used as an indicator of the line of sight which the operator can use to align the optical code with the imaging device's line of sight.

In use, the operator places an item which a customer has purchased on the scanner 104 where the scanning optics 124 direct a scan pattern over the item such that the combination of the detector 126 and the processor 130 cooperate to read a linear barcode present on the item. Concurrent with the reading of the linear barcode on the item the image capture device 128 captures an image of the linear barcode, or another optical code for example a two-dimensional barcode such as a QR code. The processor 130 then processes the captured image to extract information retained in the captured image of the optical code in the known way. As noted hereinbefore, there may be provided a number of ways in which the operator can be aided in aligning the optical code with the viewing axis of the image capture device 128. This is particularly the case when the image capture device 128 is located adjacent an operator side of the scanner 104 and is directed away from the operator side of the scanner 104 as this means that the operator will instinctively tilt the item such that its underside is viewable by the operator, thus allowing any aiming aid to be visible to the operator.

Figure 4:
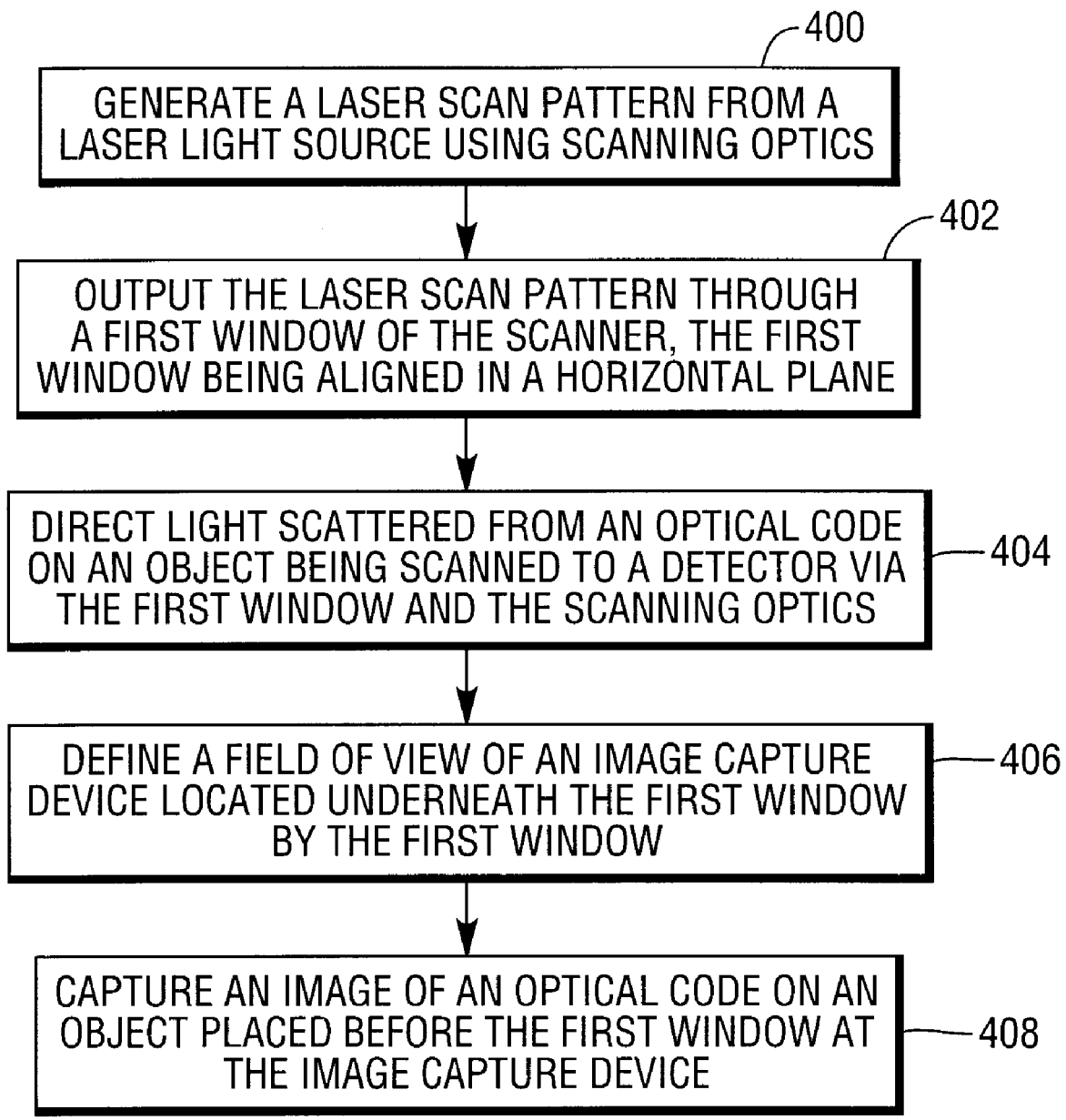
FIG. 4 is a flowchart detailing the steps of operating a combined laser and imaging scanner in accordance with an aspect of the present invention.

Referring now to FIG. 4, a method of operating a combined laser and imaging scanner comprises generating a laser scan pattern from a laser light source using scanning optics (Step 400). The laser scan pattern is output through a first window of the scanner, the first window being aligned in a horizontal plane (Step 402). Light scattered from an optical code on an object being scanned is directed to a detector via the first window and the scanning optics (Step 404). A field of view of an image capture device located underneath the first window is defined by the first window (Step 406). The image capture device captures an image of an optical code on an object placed before the first window (Step 408).

It will be appreciated that although described with reference to a bi-optic scanner the present invention is applicable to a mono-optic scanner.

It will be appreciated that although described with reference to a retail check-out terminal the present invention is applicable to any device where an optical code, such as a linear barcode or a two-dimensional barcode for example a QR-code, is to be imaged. Non-limiting examples of such devices include: an automated teller machine (ATM), an information kiosk, an electronic funds transfer (EFT) terminal, a financial services centre, a bill payment kiosk, a lottery kiosk, a postal services machine, a check-in and/or check-out terminal for example at an airport or at a hotel, a self-checkout point-of-sale (POS) terminal, POS terminal.

It will be further appreciated that although described with reference to barcodes on purchased items the optical code may be printed on paper carried by a user, for example an airline ticket, a ticket for a sporting or entertainment event, a medical appointment cared, or a driver's license and the information encoded therein may vary accordingly.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

It will be further appreciated that non-mutually exclusive elements of differing embodiments of the present invention may be freely interchanged, where applicable.

Various modifications may be made to the above described embodiments without departing from the spirit and the scope of the invention.

The invention claimed is:

1. A combined laser and imaging scanner comprises;
a laser light source;
scanning optics;
a detector;
a processor;
an image capture device; and
a first window aligned in a horizontal plane;
the laser light source and the scanning optics being arranged to output a laser scan pattern through the first window;
the scanning optics being further arranged to direct light scattered from an optical code on an object being scanned to the detector via the first window;
the image capture device being located underneath the first window such that the first window encompasses a field of view of the image capture device; and
the image capture device being arranged to capture an image of an optical code on an object placed before the first window.

2. The scanner in claim 1 wherein, a viewing axis of the image capture device is directed away from an operator side of the scanner.

3. The scanner of claim 1 comprising a second window aligned in a vertical plane adjacent the first window, the scanning optics being further arranged to output a laser scan pattern through the second window and to direct light scattered from an optical code on an object being scanned to the detector via the second window.

4. The scanner of claim 3 wherein, the second window is located adjacent a side of the first window remote from an operator side of the terminal.

5. The scanner of claim 1 wherein, the image capture device is inclined at an angle between the horizontal and vertical.

6. The scanner of claim 1 comprising a light source associated with the image capture device.

7. The scanner of claim 6 wherein the light source is aligned with the viewing axis of the image capture device.

8. The scanner of claim 1 wherein, the first window comprises a target marker indicative of the centre of the field of view of the image capture device.

9. The scanner of claim 8 wherein, the target marker comprises an indicia on the window arranged such that it disperses laser light passing through the first window.

10. The scanner of claim 1 comprising a marker laser arranged project light through the first window parallel to a viewing axis of the image capture device.

11. The scanner of claim 1 wherein, the first window has a width of less than 53 mm.

12. The scanner of claim 1 wherein, the longitudinal axis of the first window runs perpendicular to the direction of travel of objects to be scanned over the first window.

13. The scanner of claim 1 wherein, the image capture device is selected from the following: a charge coupled device (CCD) array, a complimentary metal-oxide semiconductor (CMOS) imaging array.

14. The scanner of claim 1 wherein, the processor is arranged to process data corresponding to an image captured at the image capture device.

15. The scanner of claim 1 wherein, the processor is arranged to process data corresponding to a signal generated in response to the light scattered from the optical code on the object being scanned to the detector via the first window.

16. A method of operating a combined laser and imaging scanner comprising the steps of:

generating a laser scan pattern from a laser light source using scanning optics;

outputting the laser scan pattern through a first window of the scanner, the first window being aligned in a horizontal plane;

directing light scattered from an optical code on an object being scanned to a detector via the first window and the scanning optics;

encompassing a field of view of an image capture device located underneath the first window by the first window; and capturing an image of an optical code on an object placed before the first window at the image capture device.

17. The method of claim 16 comprising directing a viewing axis of the image capture device away from an operator side of the scanner.

18. The method of claim 16 comprising projecting an aiming light through the first window parallel to a viewing axis of the image capture device.

* * * * *